Figure 1:
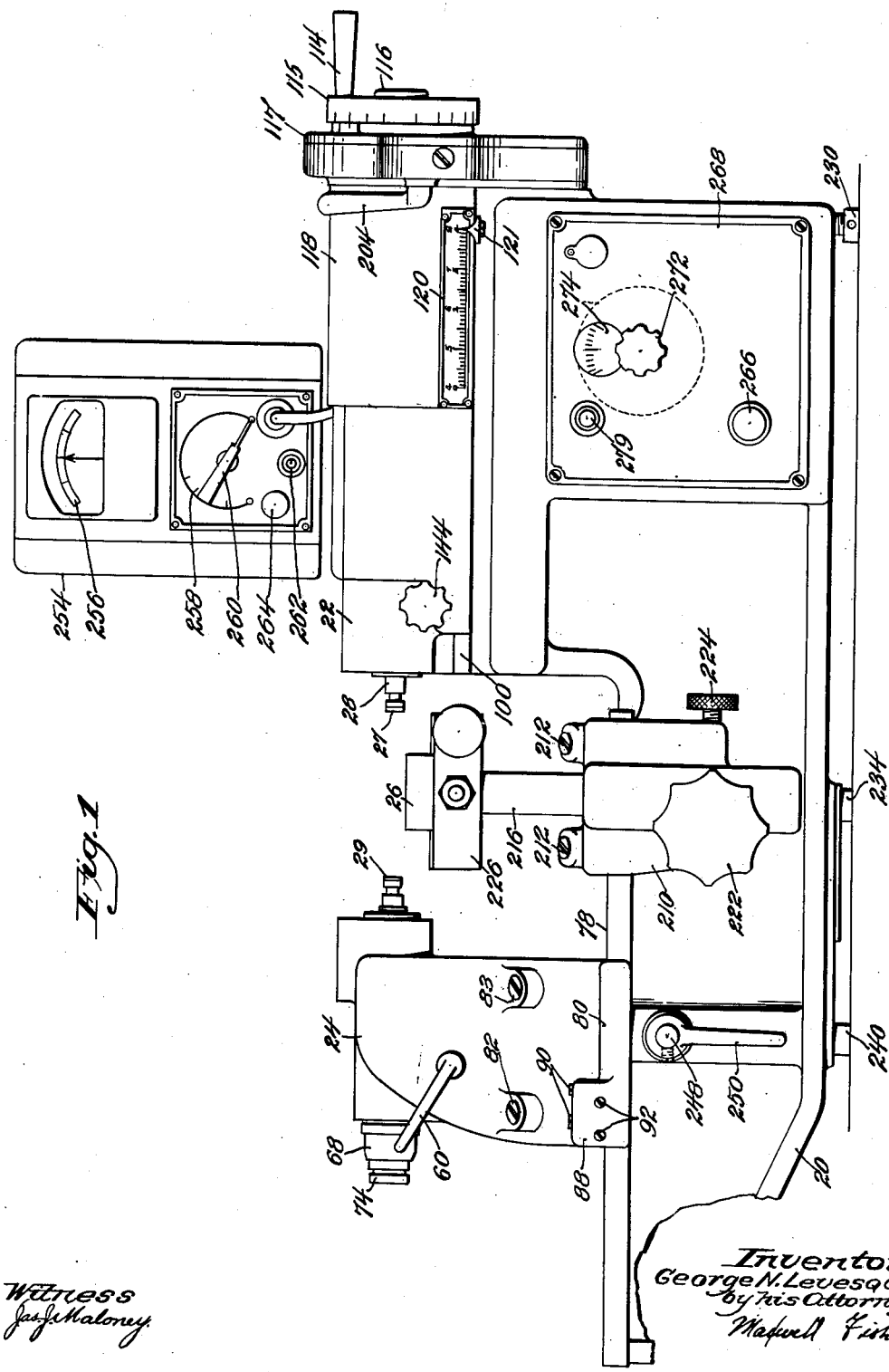

April 7, 1953

G. N. LEVESQUE 2,633,642

MEASURING MACHINE

Filed June 29, 1946

7 Sheets-Sheet 1

Witness
Jas. J. Maloney

Inventor
George N. Levesque
by his Attorney
Maxwell Fish

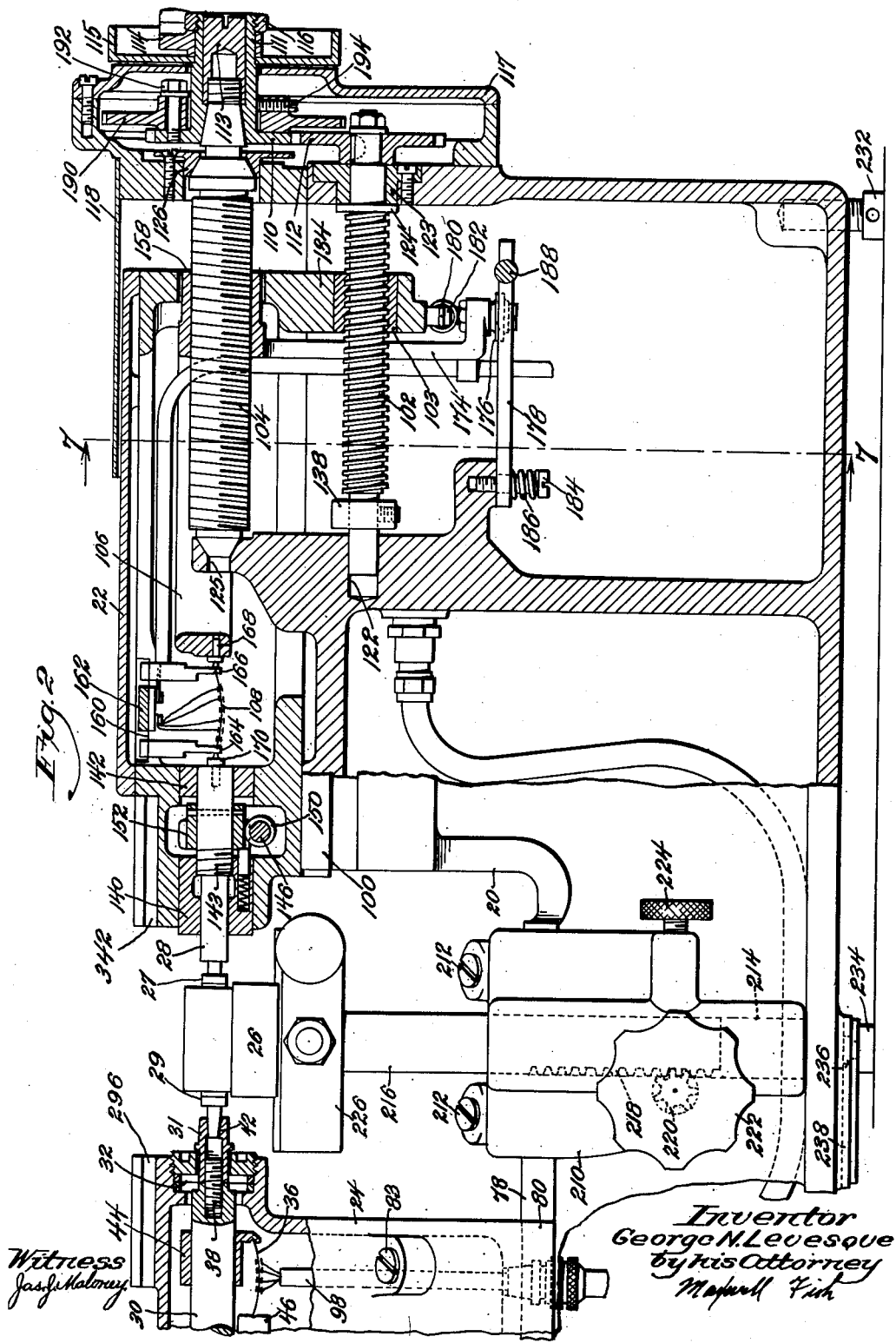

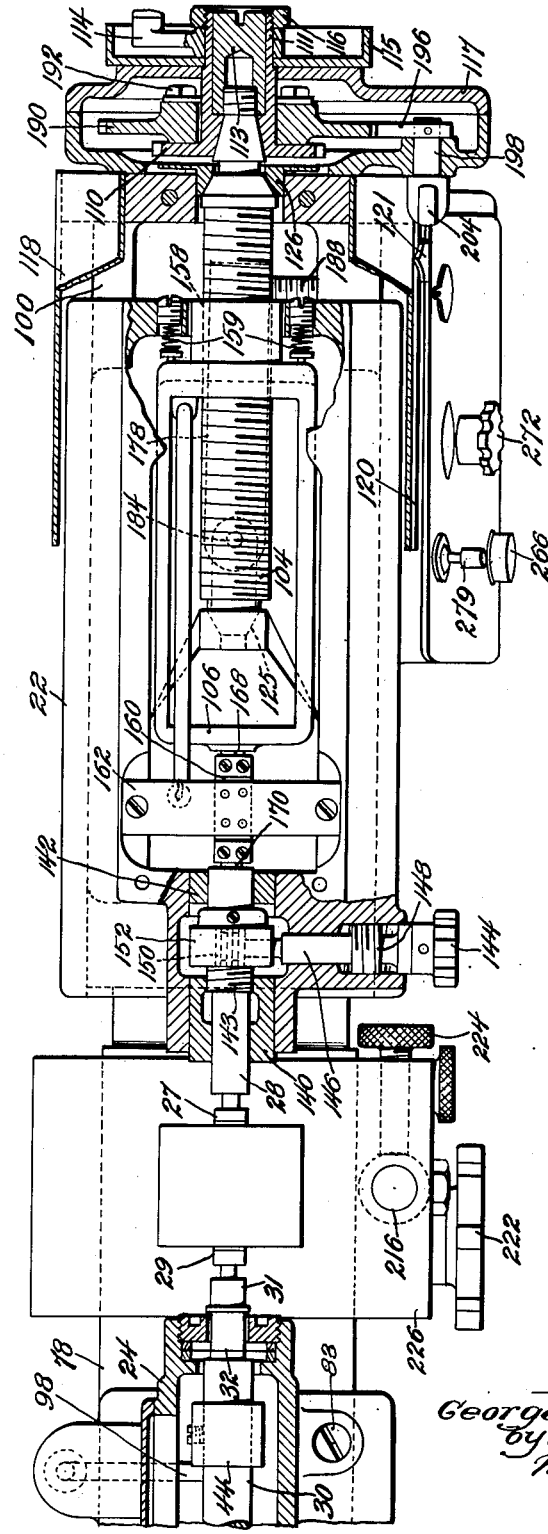

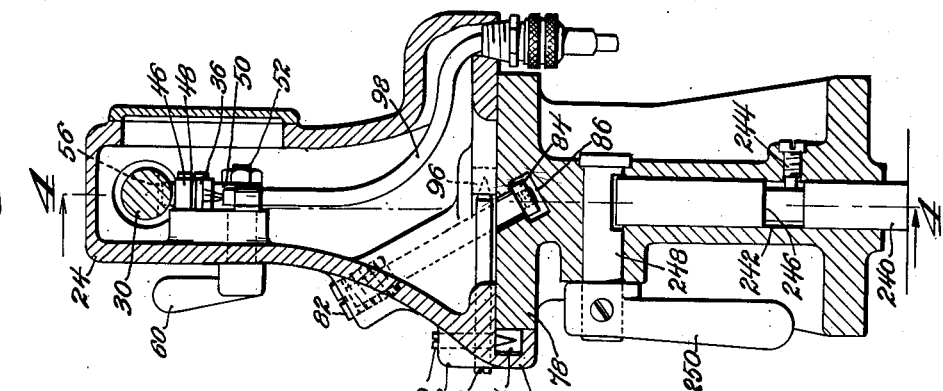

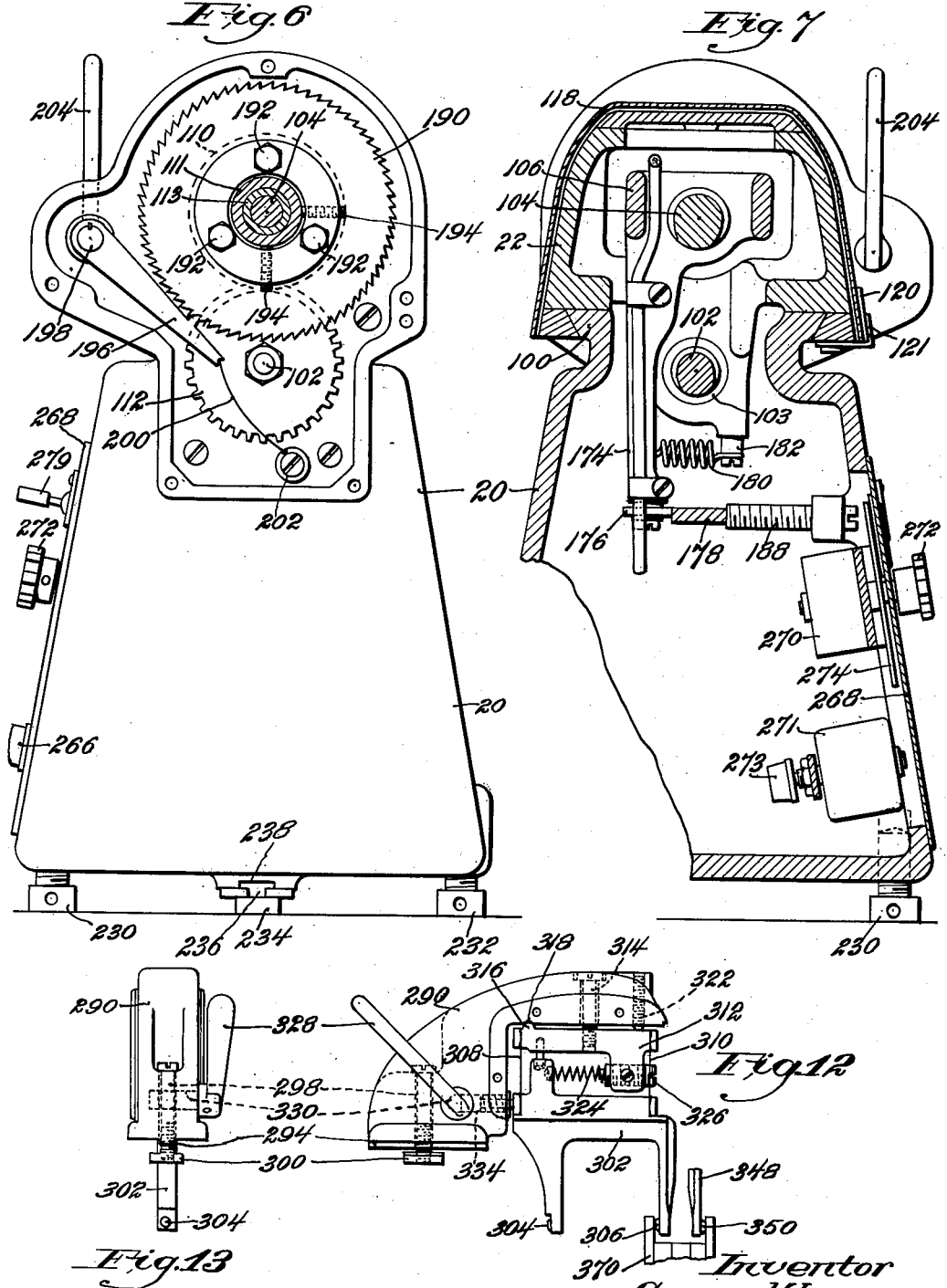

April 7, 1953    G. N. LEVESQUE    2,633,642
MEASURING MACHINE
Filed June 29, 1946    7 Sheets-Sheet 6
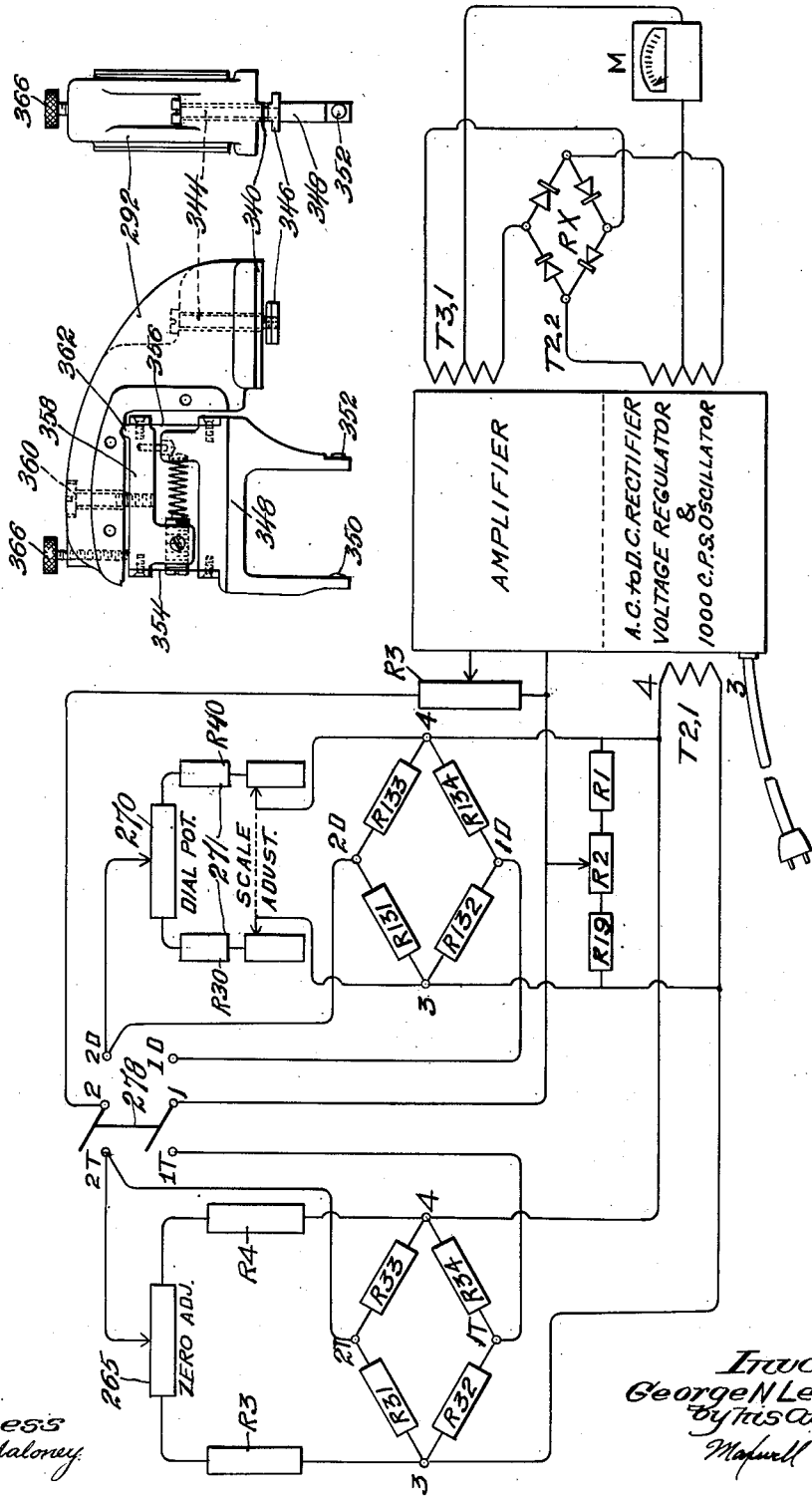
Witness
Jas. J. Maloney
Inventor
George N Levesque
by his Attorney
Maxwell Fish April 7, 1953     G. N. LEVESQUE     2,633,642
MEASURING MACHINE
Filed June 29, 1946     7 Sheets-Sheet 7
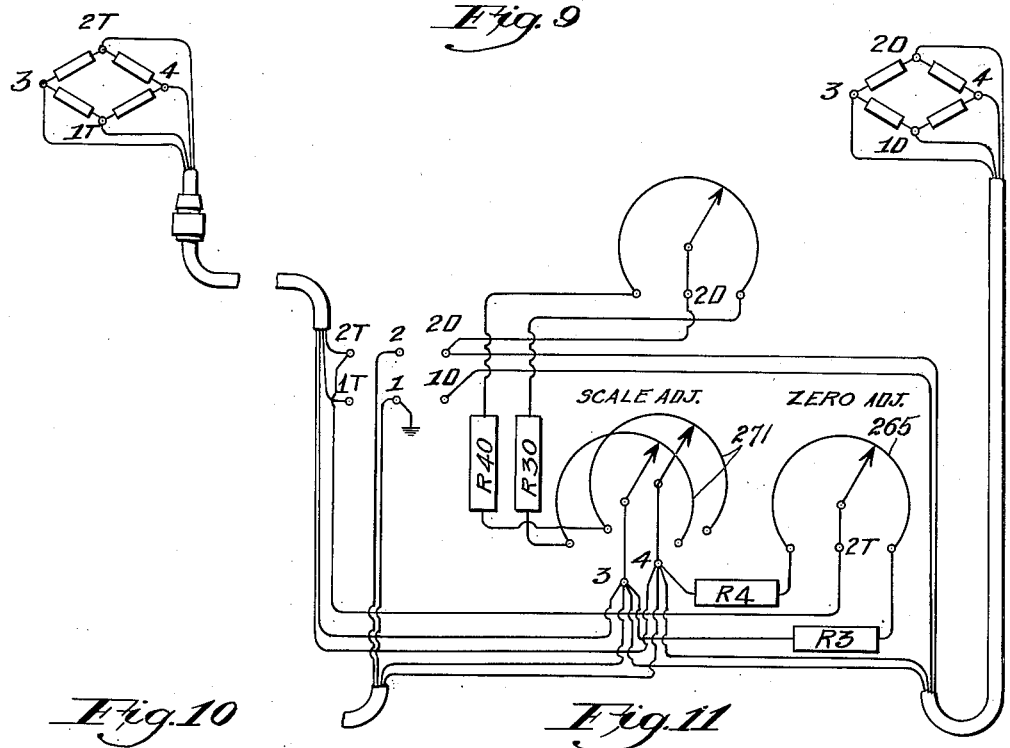
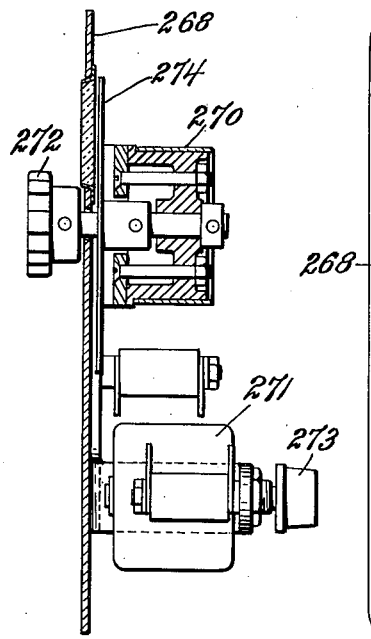
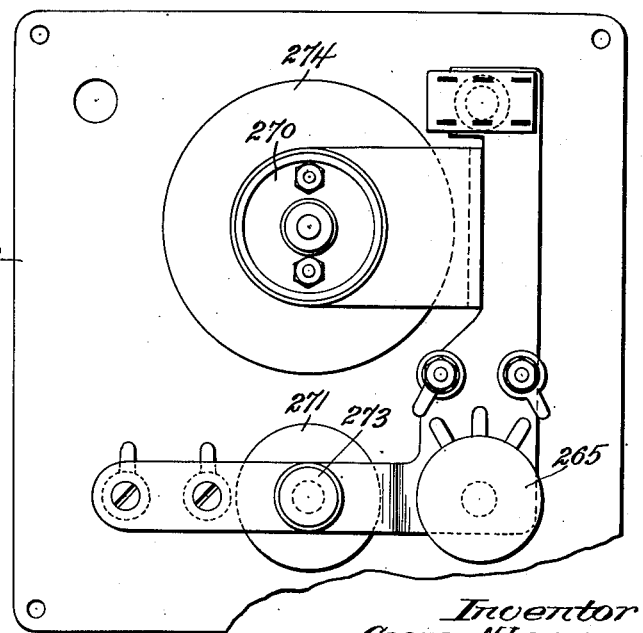

Patented Apr. 7, 1953

2,633,642

UNITED STATES PATENT OFFICE 2,633,642

MEASURING MACHINE

George N. Levesque, Cranston, R. I., assignor to Brown and Sharpe Manufacturing Company, a corporation of Rhode Island Application June 29, 1946, Serial No. 680,395

32 Claims. (Cl. 33—147)

The present invention relates to improvements in measuring machines, and more particularly to such machines capable of making measurements of solid bodies accurate to the nearest hundred thousandth of an inch. The invention is herein disclosed as embodied in a precision bench measuring machine having a range from zero to eight inches.

It is a principal object of the invention to provide a novel and improved precision measuring machine capable of measurements in the order of .00001 inch which is suitable for bench use, is capable of being manipulated quickly and easily to secure the desired readings, and does not require any extraordinary degree of skill in the handling of precision instruments for its successful use, so that the results obtained are relatively free from such errors due to human factors which are likely to arise in the use of the extremely complicated instruments known in the prior art.

More specifically, it is an object of the invention to provide a novel and improved construction and arrangement of the work contact members of the machine, together with the supporting and actuating devices therefor to provide for an accurate determination of the position of each of these members with relation to a known reference position, and further to provide gauging devices including amplifier and visual inspection means for gauging quickly and accurately the position of each member with relation to the associated reference position.

It is a further object of the invention to provide in a measuring machine of the general type described, a novel and improved mechanism for effecting movement of the headstock contact member or measuring head of the machine through precisely measured distances including such means for effecting movements over a wide range and for accurately measuring the extent of such movements of said contact member or head in terms of relatively large units of measurement in combination with additional means for moving and for measuring the extent of such movement of the contact member or head through a very small range.

It is a further object of the invention to provide an arrangement of the mechanism for importing measured movements to the measuring head or headstock measuring work contact member in which separate but correlated devices are employed connected to be driven by means of a single manually operable indexing wheel for moving and for measuring the movements of the measuring head or contact member, said devices including a measuring member which is driven separately from the measuring head and is therefore free from any deflecting or wearing stresses or strains.

It is a further object of the invention to provide a measuring device including an indexing screw and a member threaded to the screw for movements axially thereon measured in terms of rotational movement of the screw, which will be more fully and accurately compensated for errors in the screw and which is therefore capable of effecting such measured movements with a greater degree of accuracy and precision than comparable devices of the prior art.

Further in accordance with the invention, a novel method has been developed of making measurements upon work pieces with the several mechanisms and devices of the illustrated machine, which provides for the most effective use of the mechanisms and devices referred to, for the making of extremely fine measurements, and permits of the making of such measurements quickly and accurately and without any requirement for great or unusual skill or experience on the part of the operator.

It is another object of the invention to provide a novel and improved organization of a precision bench measuring machine of the general type illustrated, which includes a novel and improved location of the supporting feet of the machine to reduce deflections set up by the use of the instrument, and more particularly by the placing of the work piece thereon, to an absolute minimum.

With the above and other objects in view, as may hereinafter appear, a measuring machine is here shown embodying in a preferred form the several features of the invention, which comprises in general a pressure footstock including a footstock spindle arranged to be urged against the work piece under a carefully regulated pressure, and a headstock assembly including a movable headstock support, a headstock spindle movable on the support, and devices for imparting coarse and fine gauge positioning movements to the headstock support and headstock spindle respectively, together with means for measuring with the greatest possible accuracy the extent of such movements.

In accordance with the invention, an indexing screw is employed for effecting coarse gauge measuring movements of the headstock spindle, and mechanical means are provided in the form of a notched index plate and pawl for accurately positioning the screw in each of the indexed positions designated by the divisions of an indexing dial arranged to record the angular indexed positions of the screw. In order to obtain the necessary accuracy in the operation of the screw and driven member threaded thereto, provision is made for a careful correction of errors in the screw. In the illustrated form of the invention, provision is made for the correction of recurring harmonic errors in the screw by the eccentric adjustment of the indexing plate with relation to the screw.

The mechanism provided in accordance with the invention for imparting accurately measured movements to the headstock spindle includes a feed screw and nut for moving the headstock support, and a separate measuring screw and measuring member driven thereby in synchronism with but independently of the headstock feed screw. The measuring member in this construction provides a reference position on the headstock with relation to which measured fine gauge adjustments are made.

Further in accordance with the invention, there is provided a novel means for indicating the position of each of the headstock and footstock spindles with relation to predetermined reference positions established on the headstock and footstock respectively. The indicating means referred to, comprises a footstock engaging member in the form of a strained element connected between the footstock spindle and a stationary part of the footstock, and a headstock strained element connected at one end with the headstock measuring member above referred to, and at its other end to the headstock spindle; each of said strained elements being adapted to be maintained under a condition of strain variable in accordance with changes in the positions of the respective spindles. With each strained element there is provided strain sensitive gauging means connectible with an amplifying and visual inspection device to provide a greatly magnified and easily perceived indication of any such strain variation. In the illustrated form of the device, bonded electrical strain sensitive gauges are employed, arranged in Wheatstone bridge circuits, in combination with an electrical amplifier and visual inspection meter unit adapted to provide an extremely sensitive indication of any movement of the headstock and footstock spindle respectively with relation to the predetermined reference position.

Further in accordance with the invention, there is provided with the headstock assembly, a dial potentiometer which is connected across the headstock Wheatstone bridge circuit, and is calibrated to provide a direct indication in terms of small units of linear measure of the extent of any movement of the headstock spindle with relation to the headstock measuring member.

The several features of the invention consists also in the details of the method and in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation of a measuring machine which embodies in a preferred form the features of the invention; Fig. 2 is an enlarged sectional view in front elevation illustrating particularly the headstock and footstock actuating mechanisms, the parts being shown with a piece of work to be measured in place and with the adjustable foot located directly beneath the work supporting column; Fig. 3 is a plan view of substantially the parts shown in Fig. 2, certain of the parts being broken away and sectioned to show underlying parts; Fig. 4 is an enlarged detail view illustrating particularly the footstock and work support, the footstock being sectioned on the line 4—4 of Fig. 5; Fig. 5 is a sectional view of the footstock mechanism taken on the line 5—5 of Fig. 4; Fig. 6 is an end view of the machine looking from the right with the cover plate removed and with certain parts sectioned to illustrate particularly the drive for the headstock feed screw and measuring screw and the eccentrically movable index plate compensating for periodic harmonic errors in the screw; Fig. 7 is a sectional view taken on the line 7—7 of Fig. 2; Fig. 8 is a diagrammatic view of the bonded electrical strain gauges, the Wheatstone bridge circuits of which they are a part, and the amplifier and visual inspection units associated with the machine; Fig. 9 is a diagrammatic view of the electrical connections included on the instrument panel of the machine which include the two-way switch, and the several controls for the headstock and footstock strain gauge Wheatstone bridge circuits; Fig. 10 is a detail sectional view of the instrument panel looking from the right as viewed in Fig. 1; Fig. 11 is a detail view of the instrument panel looking from the rear and showing substantially the parts illustrated in Fig. 10; Fig. 12 is a view in side elevation of the footstock unit of an internal measuring attachment for the measuring machine; Fig. 13 is an end view of the attachment unit shown in Fig. 12; Fig. 14 is a view in side elevation of the headstock unit of an internal attachment for the measuring machine; and Fig. 15 is an end view of the attachment shown in Fig. 14.

The invention is herein disclosed in a preferred form in a bench precision measuring machine, which comprises a heavy rigidly constructed base 20; a headstock 22 which is axially movable over a range of four inches on the base, a footstock 24 which is adjustable from one to the other of two carefully adjusted positions four inches apart so that the machine has a total measuring capacity from zero to eight inches, and a work supporting assembly comprising a work supporting table 26 on which the work to be measured is mounted. The work to be measured is placed on the work support between contact anvil surfaces 27, 29 provided on headstock spindle 28 and on a footstock spindle 30 carried on the headstock 22 and footstock 24 respectively.

The footstock 24 of the illustrated machine (see Figs. 2 to 5 inclusive) comprises a housing which provides support for the footstock spindle 30 suspended for limited axial movement on two disk springs 32, 34. In accordance with a feature of the invention, the footstock spindle with its anvil surface 29 is urged under yielding pressure against the work piece to be measured by means of a tensioning member in the form of a collapsed column 36. A group of bonded electrical strain sensitive gauges R31, R32, R33 and R34 arranged in a Wheatstone bridge circuit are mounted on the collapsed column, and serve in combination with suitable amplifying and visual inspection means hereinafter more fully to be described, to provide an extremely accurate indication of the position of the footstock axially. The footstock spindle 30 comprises a central barrel portion, to which is secured at one end an anvil receiving extension 31 of reduced diameter and at its other end an extension 37, these extensions being secured to the respective ends of the barrel portion by axially disposed screw-threaded pins 38 and 40 respectively. The disk springs 32 and 34 are interposed between the central portion 30 of the footstock spindle and the extensions 31, 37 secured at each end thereof respectively, in order to provide a rigid connection between the disk spring supports and the spindle 30. The forward extension 31 of the spindle 30 is provided with a centering hole 42 which may be of ordinary description. The collapsed column 36 takes the form of a flat spring member which is interposed between a downwardly extending lug on a collar 44 on the spindle 30 and a block 46 rigidly secured by means of a pin 48 to the footstock casing 24.

Movement of the footstock spindle 30 toward the work under the influence of the collapsed spring column 36 is limited by means of a stop member 50 which is secured at its lower end to turn with a rock shaft 52, is further arranged for engagement against the rear side of the stop block 46, and is provided at its upper end with a reduced portion which is fitted loosely within a slot 56 in the spindle 30, and provides a stop surface for engagement with a corresponding stop surface on the rear end of the slot 56. A spring-pressed pin 58 seated in a recess in the footstock casing 24 engages against the movable stop member 50 to maintain said member normally in engagement with the stop block 46, this being the position of the parts shown in Fig. 4. For manually retracting the spindle, rocking movements are imparted to the stop member 50 by means of connections which include a hand lever 60 secured to the outer end of the rock shaft 52. By manipulating the hand lever 60, the operator can readily rock the shaft 52 and stop member 50 in a counterclockwise direction from the position shown in Fig. 4, to retract the spindle.

In order that an accurate adjustment of the work engaging pressure exerted by the footstock spindle 30 and anvil member 29 through the collapsed column 36 may be had, a pair of springs 62, 64 are provided, coiled one outside the other about the reduced rearward extension 37 of the spindle 30. As best shown in Fig. 4, the inner spring 64 is seated at one end against an inwardly extending flange formed on a sleeve member 68 threaded into the rear end of the footstock casing 24. At its other end the spring 64 is seated against a collar 70 which is fixedly mounted on the rearward extension 37 of the spindle 30. The outer spring 62 is seated at one end against an internal shoulder 72 formed on the sleeve member 68, and at its other end engages against the rim of an inwardly extending sleeve portion of an adjusting nut 74 threaded to the extension 37 of the spindle 30. The adjustment of the nut 74 serves to increase or decrease the net pressure exerted by the springs 62, 64 in a rearward direction counter to the direction of the pressure exerted by the collapsed column 36. Scale markings may be provided, not specifically shown but preferably located on the adjusting nut 74, to indicate the net spring pressure for each position of adjustment of the nut, one scale being provided for external measurements on the machine and a second scale being provided for internal measurements on the machine as herein after more fully set forth. The two springs 62 and 64 are so chosen and calibrated as to provide a substantially uniform net pressure resisting the movement of the spindle 30 under the influence of the collapsed column 36 over the full range of movement of the spindle, which in the present case is assumed to be approximately seven thousandths of an inch. It will be understood that the combined pressure exerted by the springs 62, 64 rearwardly is slightly less than the pressure exerted by the collapsed column 36 toward the work, so that a very small and accurately adjustable net pressure is exerted upon the spindle toward the work.

The footstock 24 as best shown in Figs. 4 and 5, is mounted for movement longitudinally of the measuring machine on a flat way 78 formed on the base 20. The way is formed with a trued surface in a horizontal plane and a trued front edge surface at right angles thereto in a vertical plane, these surfaces being engaged by a corresponding horizontal surface provided on the under side of the footstock 24 and a vertical surface provided by a downwardly extending lip 80 on the forward edge of the footstock. The footstock is rigidly clamped in position by means of a spring-seated locking bolt 82 and a second solidly seated bolt 83, said bolts being at their inner ends screw-threaded into nuts 84 which engage within a T-shaped slot 86 formed in the way 78. This arrangement provides a substantially rigid support for the footstock, but permits the rear end of the footstock to lift and thus avoids damage in the event that the operator adjusts the gibs with the bolts 82 clamped. With the present construction, means are provided for accurately positioning the footstock so that the face of the footstock work contacting anvil may be parallel to the face of the headstock work contacting anvil. These adjustments are made by means of two sets of adjusting screws mounted in a boss 88 formed on the footstock 24, which cause the footstock to be rotated independently about a vertical axis and a horizontal axis each parallel to the face of the headstock work contacting anvil. The two vertically arranged screws designated at 90, are provided for adjustment about the vertical axis, the two horizontal screws 92 being provided for adjustment of the footstock about the horizontal axis. The vertical screws 90, as best shown in Fig. 5, are provided with tapered ends which engage between them the correspondingly tapered sides of a wedge element 94 which is in the nature of a gib and cooperates with a wedge surface formed in the outer wall of the recess in the footstock within which the wedge is mounted. Lengthwise movement of the wedge or gib 94 to adjust the position of the footstock in a horizontal plane is effected by loosening one of the screws 90 and tightening the other. The similarly tapered inner ends of the horizontally arranged adjusting screws 92 are arranged for engagement with correspondingly angled end surfaces of a wedge or gib 96 disposed centrally of the footstock and its supporting way 78. The gib 96 is supported in the under face of the footstock for axial movement relatively thereof, and is adapted to cooperate with the sloping under surface of the footstock, so that endwise adjustment of the gib to the right as viewed in Fig. 4 with relation to the cammed under surface of the footstock casing is effective to raise the rear end of the footstock, whereas movement of the gib to the left is effective to lower the rear end of the footstock and thus to effect adjustment of the footstock in the vertical plane. From an inspection of Figs. 4 and 5, it will be noted that a tube conduit 98 is provided for the electrical wires leading to the strain gauges on the footstock collapsed column member 36, this conduit leading from the under edge of the footstock upwardly to a point just below the position of the collapsed column member 36.

The headstock unit of the disclosed measuring machine provides a support for the headstock spindle which is capable of relatively extended movements away from a zeroed position in engagement with the footstock spindle, and means for measuring with extreme accuracy the extent of such movements to enable the operator to measure quickly and accurately the dimensions of a work piece in terms of very small decimals of an inch. The machine illustrated in the drawing is constructed and arranged for measurements reading directly to the nearest of two hundred thousandths of an inch. The headstock 22 in the illustrated machine takes the form of a relatively long casing which is mounted for movement longitudinally on suitable ways 100 on the base 20, and carries at its forward end the headstock spindle 28 which is in turn mounted for movement axially with relation to the headstock 22. The mechanism includes a headstock feed screw 102 and nut 103 for imparting longitudinal movements to the headstock 22 and spindle 28 mounted thereon, toward and away from the footstock. In accordance with the invention, there is also provided a separate measuring screw 104 (see Fig. 2) and measuring member or frame 106 which is screw-threaded thereto. The headstock assembly of the present machine further includes a device for accurately determining and measuring any changes in the relative position of the headstock spindle 28 and the measuring member 106, so that for the determination of the distance moved by the headstock spindle from its zeroed position when measuring a work piece, it is necessary first to measure the distance moved by the headstock measuring member 106, and thereafter to determine the extent of any relative movement which may have taken place between the measuring member and the headstock spindle, the sum of the two readings being the dimension of the work piece measured by the machine. The measuring screw with the measuring member threaded thereto, provided with the headstock assembly herein illustrated, is completely disassociated from the feed screw and nut connection, so that the measuring screw may not be subject to the strains and wear incidental to the mechanical operation of moving the headstock spindle toward and away from the work piece. The mechanism provided with the preferred form of the invention to indicate any change of position of the headstock spindle with relation to the measuring member or frame 106, takes the form of a thin spring plate 108 which is inserted between the headstock spindle and the measuring member, and is bent sufficiently to form a collapsed column. Variations in the amount of bend imparted to the spring member or plate 108 by relative movement of the headstock spindle and measuring member are measured to provide an extremely accurate indication of variations in linear displacement of the spindle and measuring member. The gauging means employed include a group of bonded electrical strain sensitive gauges R131, R132, R133 and R134 mounted on the spring member 108 and connected in a Wheatstone bridge circuit to provide a sufficiently sensitive indication of variations in strain impressed upon the spring plate 108 by such relative movement of the spindle and measuring member. The indication thus produced is arranged to be calibrated to indicate relative movement of the spindle and measuring member in terms of small linear units which may be .00001 inch, by means of a dial potentiometer connected across the terminals of the Wheatstone bridge circuit and scale adjusting resistors associated therewith. The indication thus produced is amplified and is presented for the visual inspection of the operator by means of an electrical amplifier and visual inspection unit hereinafter more fully to be described.

The term "collapsed column" as used in this specification refers to a member which has been bent to a point close to its elastic limit and has collapsed as a column, so that any further slight increase or decrease in the amount of bend does not appreciably vary the amount of endwise thrust or stress exerted by said member. The range of movement of the headstock and footstock spindles is small so that the strained elements will act as collapsed columns within the range of variation in bend to which they are subjected by the movement of the headstock and footstock spindles. A more complete description of the collapsed column above referred to will be found in applicant's application for Letters Patent in the United States Patent Office, Serial No. 608,153, filed August 1, 1945, for Gauges, said application having matured as Patent No. 2,581,264, issued January 1, 1952.

Further in accordance with the invention, mechanical means are provided which act in cooperation with the manual feed and measuring screw operating means to arrest movement of the headstock unit including the measuring member 106 in any one of a number of exactly predetermined positions corresponding to scale positions indicated on the headstock for each one thousandth of an inch of movement of the headstock spindle. In the illustrated form of the device, this mechanism comprises a circular indexing plate and a cooperating spring-pressed pawl member. As hereinafter more fully pointed out, these parts in accordance with the invention, serve also as a means of correcting the angular position of the measuring screw of the device for constant harmonic errors occurring in each successive revolution of the measuring screw. Factors which contribute to produce errors of this type include lead errors in the measuring screw, run-out in the bearings for the measuring screw, run-out of the mounting for the index plate, and errors in the index plate.

The feed screw 102 and the measuring screw 104 are connected to be driven synchronously but in opposite directions by means of a gear 110 carried on a rearward extension of the measuring screw 104 and a gear 112 having the same diameter and number of teeth which is splined to an extension of the feed screw 102 to mesh with the gear 110. The gear 110 is provided with a relatively long outwardly extending sleeve hub 111, and is rigidly secured by means of a taper fit and a locking nut 113 to the rearward extension of the measuring screw 104. Rotational movement is imparted to the feed screw 102 and measuring screw 104 by means of a hand wheel 114 which is mounted together with a calibrated dial 115 on the reduced outer end of the sleeve hub of the gear 110, being rigidly secured in place thereon by means of a locking nut 116. The pitch of the synchronously driven feed screw and measuring screw is such as to cause the headstock 22 and the measuring member or frame 106 to have imparted thereto substantially identical movements in the same direction, one revolution of the hand wheel 114 and screws driven thereby being equivalent to one tenth of an inch of movement of the headstock and measuring member. The dial 115 is marked with one hundred divisions to provide a direct measurement of movement of the headstock in terms of hundredths and thousandths of an inch. Certain portions of the driving mechanism including particularly the gears 110, 112 are housed in a casing 117 secured to the end of the headstock. As best shown in Fig. 1, a shield or cover 118 extending forwardly from the rear wall of the supporting base 20 extends forwardly over the headstock 22, and provides protection for the feed screw and measuring screw and other associated parts when the headstock 22 is moved forwardly toward the footstock. A scale 120 on the side of the cover or shield 118 arranged to cooperate with a pointer 121 carried on the rear end of the headstock 22, is calibrated to provide a direct reading of the position of the headstock in terms of inches and tenths of an inch.

As specifically illustrated in Fig. 2 of the drawings, the feed screw 102 for imparting translatory movements to the headstock 22 is mounted at one end in a bearing 122 formed in a wall of the base 20, and at its other end in a bearing member 123 which is secured in the rear wall of the base 20. The bearing member 123 serves also as an end thrust bearing for the feed screw, being engaged at one side thereof by a narrow collar 124 on the feed screw, and at its other side by the hub of the gear 112. The measuring screw 104 is supported at its forward end as shown in Fig. 2, in a taper bearing 125 in the wall of the base 20, and at its other end in an oppositely tapered bearing formed in a bearing member 126 mounted in the rear wall of the base 20. A collar 138 secured to the left hand end of the feed screw 102 as shown in Fig. 2, provides a positive stop to limit advancing movement of the headstock nut 103 and headstock 22 under the influence of the hand wheel 114.

In accordance with the invention, manually operable means are provided for effecting a fine adjustment of the position of the headstock spindle 28 axially on the headstock 22. In the illustrated embodiment of the invention, the extent of such movement is then measured specifically with relation to the position of the measuring member 106 by means of the strained spring plate 108 and associated indicating, amplifying and visual inspection means herein described, adapted for measuring the adjusted position of the headstock spindle 28 to the nearest hundred thousandth of an inch.

As best shown in Fig. 2 of the drawings, the headstock spindle 28 is mounted for rotational and axial movement in two bushings 140, 142 mounted in the left hand or leading end of the headstock, and the spindle is additionally screw-threaded at 143 for engagement with an internal thread formed in the bushing 140, so that rotational movement of the spindle 28 is effective to advance or retract the spindle with relation to the headstock 22. Such axial adjustment of the headstock spindle 28 is effected by means of a fine adjustment knob 144, through connections which comprise a laterally extending pin 146 which is provided with a screw-threaded collar 148 for engagement with an internal screw thread formed in an enlarged recess portion of the headstock 22, so that rotational movement of the pin 146 has the effect also of moving it axially. At its inner end the pin 146 is provided with circular rack teeth 150 which engage with corresponding teeth formed in a sleeve element 152 rigidly pinned to the headstock spindle 28.

The mechanism provided in accordance with the invention for accurately measuring the total extent of the movement of the headstock spindle 28 from its zeroed position in which it is in engagement with the footstock spindle similarly zeroed, comprises the measuring screw 104, the measuring member or frame 106 moving with but independently of the headstock 22, and the collapsed column provided by the spring plate 108, together with the strain sensitive gauging means hereinafter more fully to be described, for measuring the variations in strain to which the plate 108 is subjected. As best shown in Figs. 2, 3 and 7, the measuring member or frame 106 takes the form of an open rectangular frame which is formed at its rear end with a nut 158 threaded to the measuring screw 104. The frame 106 moves substantially in unison with the headstock 22, but independently thereof on the measuring screw 104. The spring plate 108 is supported in its collapsed condition between a contact point 168 on the leading end of the measuring member 106 and a similarly formed contact point 170 on the rear end of the headstock spindle 28. The thrust of the strained element or plate 108 in one direction acts to force the measuring member 106 rearwardly against the measuring screw 104. The thrust of the strained element or plate 108 in the opposite direction acts to force the headstock spindle 28 forwardly against the headstock spindle support 22. A pair of compression springs 159 (see Fig. 3) interposed between the rear end of the measuring member 106 and the adjacent yoke portion of the headstock spindle support 22 tend to move these parts relatively in a direction opposite to that in which they are urged by the strained element or plate 108. The pressure exerted by these springs tends to hold the measuring member 106 with the threaded portion thereof against the left hand sides of the measuring threads, and being greater than that exerted by the strained element or plate 108 causes the measuring screw to be held firmly against the conical bearing 125 at the left or forward end of the screw. The springs 159 further are placed slightly below the center line of the measuring screw so as to overcome the overhanging load caused by the weight of the measuring member 106.

The spring plate 108 is supported or suspended in the intervening position between contact points 168, 170 independently of the headstock spindle 28 and measuring member 106. The supporting structure for the spring plate 108 comprises a leaf spring 160 secured to a transverse plate or bracket 162 on the headstock 22, and provided at opposite ends with downwardly extending arms 164, 166 which provide support for the spring plate 108. The plate 208 is thus connected between and is caused to be stressed to a greater or less degree by the relative movements of the points 168, 170. The collapsed column provided by the spring plate 108 and the bonded electrical strain sensitive gauging means associated therewith, provide an extremely sensitive means for detecting change in the relative position of the measuring member 106 and headstock spindle 28. In the illustrated form of the invention, the Wheatstone bridge circuit connecting the strain gauges has mounted therein a dial potentiometer with a dial having fifty scale markings, and the apparatus is calibrated in such a manner as to cause a movement across one division of the potentiometer dial to correspond to a headstock spindle movement of .00002 inch.

In accordance with the invention, novel and improved means are provided for adjusting the position of the measuring member 106 to compensate for errors known to exist in the measuring screw 104, so that the indicating devices will provide for the operator an exact indication of the present position of the measuring member 106.

In order to compensate for gradually changing lead errors throughout the length of the screw, a compensating device is provided to rock the nut 158 slightly during the progress of the nut along the length of the screw, and thus to effect the required axial adjustment of the nut to eliminate this error. The mechanism provided for compensating for changing lead errors, comprises a downwardly extending arm 174 formed integrally with the measuring member 106 and nut 158 which carries at its lower end a follower cam roller 176 for engagement with a cam bar 178. A coiled tension spring 180 connected between a pin 182 on the under side of the downwardly extending portion 134 of the headstock 22 and at its other end to the arm 174 acts to bias the arm and cam roller 176 against the cam surface of the bar 178. As best shown in Figs. 2, 3 and 7, the cam bar 178 is pivotally supported on one end on a pivot pin 184 and held yieldably against its seat on the base 20 by means of a coil spring 186. At its other end the cam bar 178 is arranged for engagement against an adjustable screw stop 188 threaded into a boss formed in the base 20.

In accordance with a feature of the invention, provision is made also for compensation of periodic harmonic errors in the measuring screw or bearings where such errors are repeated during each successive revolution of the measuring screw. The mechanism provided for effecting this correction acts automatically when the screw has been moved to its indexed position in accordance with any one of the markings on the indicator dial 115 to automatically re-adjust the angular position of the measuring screw and indicator dial 115 to compensate for the amount of the periodic harmonic error which may exist for the particular angular position of the measuring screw with relation to its nut. The mechanism provided for effecting this correction, comprises a circular indexing plate 190 which is fitted loosely over the sleeved hub 111 of the gear 119, and is secured to the face of the gear by means of three bolts 192 which pass through oversize holes in the hub of the index plate to permit the indexing plate to be adjusted eccentrically with relation to the gear 110 and associated parts including the measuring screw 104. An adjusting set screw 194 threaded radially inwardly through the hub of the indexing plate 190 for engagement with the sleeve hub 111 of the gear 110 provides convenient means for accurately adjusting the amount of eccentricity of the index plate 190. As best shown in Fig. 6 of the drawing, the index plate is arranged to be acted upon by a cooperating one toothed pawl 196 supported to turn on a rotatable pivot pin 198 and to be maintained in either of two alternate engaging and disengaging positions by means of a leaf snap spring 200 interposed between the notched outer end of the pawl and a notch formed in a fixed pin 202. An upwardly extending manually operable lever arm 204 secured to the pivot pin 198 provides convenient means for shifting the pawl from its engaging to its disengaging position. In the operation of the device, the operator acts first to disengage the pawl 196 from the index wheel 190, rotates the hand wheel 114 to approximately its adjusted position, and then shifts the pawl 196 again into engagement with the teeth of the indexing plate. The movement of the pawl into engagement with the sloping toothed surface of the indexing plate causes the hand wheel 114, the measuring screw 104 and measuring member 106 to be located precisely at the indicated thousandth of an inch in accordance with the correction made due to the eccentricity of the indexing plate as the tooth of the pawl becomes firmly seated between the two adjacent teeth of the indexing plate. The indexing plate and pawl operating as above described, are of advantage further in that they provide for the mechanical setting of the measuring screw and measuring member in the adjusted position, thus avoiding the uncertainty and possibility of error inherent in a manual setting of the hand wheel.

The present machine is provided with a work rest which comprises a base member 210, see particularly Figs. 1, 2, 3 and 4, which is mounted on the guideways 78 which carries the footstock, being held rigidly in adjusted position by means of two locking bolts 212 which are formed with enlarged heads screw-threaded into square nuts mounted in the T-shaped slot 86 in the way 78. The work rest base 210 is formed with a vertically arranged guide well 214 in which is supported a vertically movable post 216 having formed on one side thereof a rack 218 for engagement with an adjusting pinion 220. The pinion is manually operated by means of a knob 222 secured to the outer end thereof. A locking screw 224 provides convenient means for locking the post in adjusted position. The work rest mounted on the post 216 is only generally indicated, as this device forms specifically no part of the present invention. The work rest comprises generally the table 26 which is longitudinally movable on a support 226 and is adjustable in several planes for ease of handling the work.

In accordance with another feature of the invention, a novel and improved footing support is provided for the measuring machine herein illustrated, which is well adapted to eliminate any errors in the measurements made on the machine which might otherwise result from warping or springing of the base when the work piece is placed in the machine. In accordance with the invention, the machine is arranged to be supported on two relatively stationary feet at the headstock end of the machine designated at 230, 232 as best shown in Figs. 2 and 6, and on a third foot 234 which is adjustable in such a manner as to be located directly beneath the work support and work mounted thereon for any position of the work support and work thereon. The foot 234 is provided with an upwardly extending pin 236 with an enlarged head which is arranged to ride in a T-shaped slot 238 formed in the under side of the base 20. To facilitate the adjustment of the foot 234 in accordance with the adjusted position of the work support lengthwise of the machine, a lifting device or jack is provided in the form of a vertically arranged post 240 which is slidably supported in a vertical hole 242 in the base. A stop screw 244 provided with a tip which extends into a recessed portion 246 of the lifting post 240 serves to positively limit movement of the post in either direction. At its upper end the post is arranged to engage against the flattened portion of a transversely extending rock pin 248 provided at its outer end with a manual control lever 250. Rocking of the control lever 250 acts to relatively depress the post 240, and thereby to raise the footstock end of the measuring machine, thus permitting a ready adjustment of the longitudinally adjustable foot 234.

In accordance with the invention, gauging means are provided for gauging with an extreme degree of accuracy the positions of each of the headstock and footstock spindles at certain stages in the operation of measuring a work piece. In the preferred form of the measuring machine illustrated, and in accordance with the novel method of operation hereinafter set forth, the highly sensitive gauging means provided are employed to establish a zero reference position of the footstock spindle 30 on the footstock 24, to establish a zero reference position of the headstock spindle 28 with reference to the measuring member 106, and also to provide a direct readily-perceived measurement of any movement of the headstock spindle 28 with relation to the measuring member 106 in terms of very small linear units in the order of a hundred thousandth of an inch. The gauging means employed comprises specifically the collapsed column members 36 and 108 above described, and the bonded electrical strain sensitive gauges carried thereon connected in Wheatstone bridge circuits, together with an amplifier and visual inspection unit 254 which enables the operator to readily and quickly determine the zero position of each spindle in turn. The amplifier and visual inspection unit 254 as shown in Fig. 1 and in the diagram Fig. 8, comprises an amplifier unit casing having mounted thereon an indicator dial 256 from which is read the amplified indication of unbalance of the Wheatstone bridge circuits associated with each spindle, together with the direction of said unbalance to indicate any displacement of the spindle with reference to a predetermined intermediate zero position. Other devices carried on the amplifier unit casing include a sensitivity adjustment dial 258, a sensitivity adjustment knob 260, an off-on switch 262 and a zero adjustment knob 264.

As best shown in Figs. 1 and 8 to 11 inclusive, the Wheatstone bridge circuit associated with the the footstock spindle strain gauge gauging device has connected across the terminals 3, 4, a zero adjustment potentiometer 265 with a hand knob 266 which is mounted on a panel cover 268 on the base 20. The Wheatstone bridge circuit associated with the strain gauge gauging device for gauging the position of the headstock spindle, has connected across its terminals 3, 4, a dial potentiometer 270 together with auxiliary resistors R30, R40 and a scale adjustment potentiometer 271 connected for scale adjustment of the potentiometer 270, these parts including a hand knob 272 with a graduated dial 274 mounted on the panel 268. The scale adjustment is effected by means of a manually operable knob 273 on the back side of the panel 268. The dial 274 is formed with fifty divisions, each of which corresponds to a movement of the headstock spindle 28 with relation to the measuring member 106 a distance of .00002 inch. The construction and adjustment of the electrical circuits is such that the movement of the potentiometer dial 274 required to eliminate any unbalance in the Wheatstone bridge circuit due to movement of the headstock spindle 28 relative to the measuring member 106 and to cause the pointer of the visual inspection meter to return to zero, provides an exact measure of the distance moved by the headstock spindle 28. The Wheatstone bridges and potentiometers above referred to, are arranged to be connected one at a time by means of a double throw switch 278 controlled by a knob 279 on the panel 268 with the amplifier and visual inspection unit. This unit as illustrated generally in Fig. 8 is housed in its entirety within the amplifier and visual inspection unit housing 254. Since the electrical devices and connections employed in the amplifier and visual inspection meter assembly are well known in the art and form specifically no part of the invention, only such description is included as is believed necessary to enable one skilled in the art to understand the connection of the persent invention therewith. It will be understood that means other than the potentiometers as, for example, variable capacitors may be employed for controlling the balance of the Wheatstone bridge circuits.

As shown in the diagrammatic Fig. 8, current is supplied to the strain gauge Wheatstone bridge circuits from an A. C. supply through a conventional rectifier circuit which serves to supply a filtered direct current voltage. Part of the D. C. current is regulated by a gaseous regulator tube which, being a piece of ordinary equipment, is not shown, to supply a 1000 cycles-per-second triode oscillator and the last amplifier tube of the amplifier circuit which is again of ordinary description. The 1000 cycles-per-second oscillator supplies both Wheatstone bridges through secondary T2,1 of the oscillator transformer, and also the rectifier RX through secondary T2,2 of the same oscillator transformer. The output terminals of either of the two Wheatstone bridges may be connected alternately to the amplifier by means of the selector switch 278. Forming part of the connections to each Wheatstone bridge circuit are two resistors R1 and R19, which together with the potentiometer R2 afford a means for electrically adjusting the balance of the active strain gauge bridge circuit. Any unbalance voltage appearing across two of the terminals designated at 1 and 2 respectively, is fed to the potentiometer R3, which by means of the conventional knob 260 and graduated scale 258 on the front of the amplifier, is used to vary sensitivity of the device. Any desired fraction of the unbalance voltage is detected by the potentiometer R3, and is impressed on the grid of the first amplifier tube of the amplifier. The unbalance voltage is amplified and appears in the secondary T3,1 of the output transformer associated with the last amplifier tube. The output current is rectified by the circuit consisting of the ring connected oxide rectifier RX, the transformer windings T3,1 and T2,2. A current flows through the meter M which is proportional to the strength of the output voltage, hence to the degree of strain gauge bridge unbalance, and in a direction determined by the relative phase relations between the voltage in the transformer winding T2,2 and the voltage in the transformer winding T3,1 which is in turn determined by the direction of the strain of the bridge unbalance.

The preferred method of operating the measuring machine herein described, for the making of an external measurement on a work piece, will be briefly described as follows: First the footstock 24 is located in adjusted position. In the event that the work to be measured is less than four inches in diameter, the footstock 24 is located in the inner of its two alternative positions as shown in Fig. 1. In the event that the work piece is greater that four inches in diameter, the footstock 24 will be moved four inches to the left to a precisely determined position on the way 78. The work support is now adjusted to its proper position, the base 210 being moved along the guideway 78 until it is centrally located with respect to the work piece when engaged against the footstock spindle 30. The hand lever 250 is now operated to temporarily raise the footstock end of the machine while the foot 234 is adjusted lengthwise directly beneath the work support on the base 210. The footstock is now further trued by manipulation of the vertical and horizontal plane adjustment screws 94 and 92. Such adjustments as may be necessary are made also to the work support to bring the work support exactly into the horizontal plane.

In setting up the machine for the taking of any particular measurement, the strain gauge circuits above described, are successively adjusted to zero in the following manner: The headstock 22 is moved to the left to its zero position. The double throw switch 278 is tripped to the right, and the dial potentiometer and the scale adjustment are set exactly at zero. The meter pointer is now brought to exact zero by movement of the headstock spindle 28 with relation to the headstock 22 and measuring member 106 by means of the fine adjustment knob 144. The double throw switch 278 is now tripped to the left, and the pointer of the visual inspection meter is again brought to its zero position through the balancing of the footstock Wheatstone bridge circuit by adjustment of the footstock zero adjustment potentiometer 265 through manipulation of the knob 266 on the panel 268.

The machine is now in condition for the making of an external adjustment, the double throw switch 278 being in its position to the left. The headstock 22 is now backed away from the footstock a sufficient distance to allow the insertion of the work piece on the work support 226. The headstock fine adjustment knob 144 is rotated in a clockwise direction to the limit of its movement to advance the headstock spindle 28 to its fully extended position toward the work. The hand lever 204 is now moved to disengage the pawl 196 from the index plate 190 and the hand wheel 114 is operated to advance the headstock 22 and headstock spindle 28 against the work until the headstock and work piece engaged thereby have forced the footstock spindle 30 rearwardly a sufficient distance to cause the pointer of the visual inspection meter 256 to show positive, indicating that the footstock anvil has been retracted beyond its normal zero position. The pawl 196 is now tripped by means of hand lever 264 against the toothed edge of the indexing plate 190, causing the indexing plate to be locked in position in the largest complete thousandth of an inch, thus accurately determining the position of the headstock 22 and measuring member 106 to the nearest thousandth of an inch. The fine adjustment knob 144 is now rotated to retract the headstock spindle, permitting the work piece and the footstock spindle under the pressure of its strained spring member 36 to be extended until the visual inspection meter pointer is brought to an exact zero position. The double throw switch 278 is now again tripped to its position to the right, connecting the headstock Wheatstone bridge circuit and dial potentiometer 270 with the amplifier and visual inspection meter unit. The dial potentiometer 270 is now rotated from the zero position to which it is set through a sufficient distance to re-establish a balance of the headstock Wheatstone bridge circuit, and thus to bring the pointer associated with the visual inspection meter back to a zero position. The distance thus moved by the dial of the headstock potentiometer 270 provides a dial indication in units of two one hundred thousandths of an inch each of the distance moved by the headstock spindle 28 from its zeroed position with relation to the measuring member 106. The final reading achieved by the machine will include a reading in terms of inches and tenths of inches from the relative positions of the scale 120 and pointer 121, a reading in terms of hundredths and thousandths of an inch in accordance with the position of the hand wheel 114 and indicating dial 115 associated therewith, and finally a reading of the number of additional ten and one hundred thousandths of an inch in accordance with the reading of the dial potentiometer 270.

In accordance with the disclosure of Figs. 12 to 15 inclusive of the drawings, an internal measuring attachment is provided which will adapt the machine of the present invention for the making of internal measurements. The internal attachment referred to, comprises an internal attachment footstock unit 290 shown in Figs. 12 and 13, and an internal attachment headstock unit 292. The footstock unit 290 consists of a casing or frame member provided with a tongue member 294 which is fitted into the slot opening of a T-shaped guideway 296 on the footstock 24, and to which it is rigidly clamped by means of a bolt 298 and a locking nut 300. The casing 290 provides a support for an anvil supporting member 302 which carries on a downwardly extending arm, an anvil 304, and on a second downwardly extending arm, an internal work engaging footstock anvil 306. The member 302 with anvils 304, 306 is supported for movement on the line of centers upon a pair of reed supports 308, 310 on a supporting block 312 which is forced upwardly and supported against abutting surfaces on the bracket 290 by means of a clamp screw 314. A semi-cylindrical rib 316 formed on that end of the block 312 away from the work piece is adapted for locking engagement in a cooperating V-shaped groove 318 formed in the bracket 290. The block is supported at its outer end against an adjusting screw 322. A compression spring 324 interposed between an adjusting screw 326 on a downward extension of block 312 and a seat formed in an upward extension of the member 302 serves to urge the member 302 and contact points 304, 306 to the left to engage the contact point 304 against the footstock anvil 29. The strength of the spring 324 is such as to overbalance the spring system provided by the strained element 36 and tension adjusting springs 62, 72, so that the internal attachment footstock anvil 206 is urged yieldably to the left away from the headstock for engagement with internal work surfaces. In order that the pressure exerted against the work by the footstock internal attachment anvil 306 may be adjusted to a predetermined value in accordance with the requirements of the work, a second scale is provided on the adjusting screw member 74 which is calibrated to provide a direct reading of the adjusted pressure exerted against the work surface by the internal measuring anvil 306 through the spring system including spring 324.

The member 302 with anvils 304, 306, is adapted to be moved positively to the right to release the work by means of connections which include a manually operable lever 328, a rock shaft 330 having a flattened cam portion formed in the periphery thereof, and a plunger 334 which is interposed between the periphery of the rock shaft 330 and the member 302. Rocking movement of hand lever 328 to the right causes the plunger 334 and the anvil supporting member 302 therewith to be moved to the right against the pressure of its spring 324 to release the work.

The headstock internal measuring unit as shown in Figs. 14 and 15, comprises the casing 292 having formed on the under side thereof a tongue member 340 for engagement in the slot opening of a T-shaped guideway 342 on the headstock spindle support 22. A clamping screw 344 and nut 346 serve to clamp the internal attachment headstock unit in its adjusted position. The casing 292 provides support for a headstock internal attachment anvil supporting member 348 having formed thereon a downwardly extending arm which carries thereon a headstock work engaging anvil 350 for internal measurements, and a second downwardly extending arm with an anvil 352 for engagement with the headstock anvil 28. The headstock internal anvil supporting member 348 is mounted to move axially upon two reed supports 354, 356 carried on a supporting block 358. The block 358 is secured by means of a screw 360 which acts to force the block upwardly, causing a semicylindrical rib 362 formed in one end of the block to be held in locking engagement with a V-shaped groove in the bracket 292, while the other end of the block is engaged against an adjustable stop screw 366.

When the machine is used for the making of internal measurements, the range of measurement which can be made is from a minimum size as determined by the combined thickness of the internal attachment footstock anvil 306 and headstock anvil 350 to a maximum of about four inches. The method of operation of the measuring machine when set up for the making of internal measurements is generally similar to the method of operation above described in connection with the making of external measurements, but with the following changes. In order to secure a zero setting of the machine for internal work, the internal attachment anvils 306 and 350 are set a predetermined distance apart which may, for example, be one-half inch by means of gauge blocks 370 as shown in Fig. 12, and the headstock spindle support 22, the micrometer screw indicator dial 115 and the dial 274 of the dial potentiometer 270 are zeroed in this position. The procedure to be followed thereafter is the same as that previously described, except that for the making of internal measurements upon a work piece, the headstock is retracted instead of being advanced to engage the internal attachment anvils 306, 350 against the work piece, and this retracting movement is continued until the pointer on the dial of the amplifier and visual inspection unit 254 connected with the footstock strain gauging assembly is caused to be moved well to the left or minus side of the dial.

It will be understood that the invention is not limited to the specific embodiment shown, and that various deviations may be made therefrom without departing from the spirit and scope of the appended claims.

What is claimed is:

1. In a measuring machine, a base, a work contacting element movable on the base to measure the work, means for effecting a measured movement of said work contacting element including a work contacting element positioning screw supported from the base, a measuring screw supported from the base, means for rotating said screws synchronously, and means connecting the work contacting element with the measuring screw including a measuring member threaded to the measuring screw, a strained element connected between said measuring member and work contacting element in a manner to be maintained under a condition of strain variable in accordance with any relative displacement of the work contacting member and measuring member, and indicating means connected to indicate the condition of strain of said strained element.

2. In a measuring machine, the combination of a base, a headstock comprising a headstock spindle support shiftable on the base, a headstock spindle shiftable on the headstock spindle support, a feed screw for effecting axial adjustment of the headstock spindle support, a measuring screw synchronized to turn with the feed screw, a measuring member arranged to be moved by the measuring screw in the same direction with but independently of the headstock spindle support, indicating means having divisions indicating the adjusted angular position of the measuring screw in terms of linear adjustment of the measuring member and headstock spindle support therewith, means for effecting a fine adjustment in the position of the headstock spindle with relation to the headstock spindle support including means for moving the headstock spindle on the headstock spindle support, and indicating means including an element supported between the headstock spindle and measuring member and arranged to be subjected to measurable variations of strain by movement of said spindle, and strain sensitive gauging means connected with said strained element to provide an indication of any variation of such strain, and amplifying and visual inspection means to amplify and to present for visual inspection said amplified indication.

3. In a measuring machine, the combination of a base, a footstock, a headstock comprising a headstock spindle support movable on the base, a headstock spindle shiftable on the headstock spindle support, a feed screw for shifting the headstock spindle support, a measuring screw synchronized to turn with the feed screw, a measuring element arranged to be moved by the measuring screw with but independently of the headstock spindle support, indicating means having divisions indicating the adjusted angular position of the measuring screw in terms of linear position of the measuring element and headstock spindle support therewith, means for moving the headstock spindle on the headstock spindle support, and indicating means for indicating the position of the spindle with relation to said measuring element comprising a strained element connected therebetween to be subjected to measurable variations of strain by movement of the headstock spindle relative to said member, and strain sensitive gauging means comprising a Wheatstone bridge circuit including a bonded electrical strain sensitive gauge on said strained element, an amplifier and visual inspection unit connected to provide a magnified indication of any unbalance of said Wheatstone bridge circuit, and a variable element disposed to control said Wheatstone bridge circuit adjustable to effect a zero balance of said Wheatstone bridge circuit and calibrated to indicate in predetermined units of linear measure the corresponding distance required to be moved by the headstock spindle to restore said balance.

4. In a measuring machine, the combination of a base, a headstock comprising a headstock spindle support shiftable on the base, a headstock spindle shiftable on the headstock spindle support, a feed screw supported from the base for moving the headstock spindle support, a measuring screw supported from the base synchronized to turn with the feed screw, a measuring element arranged to be moved by the measuring screw with but independently of the headstock spindle support, an indicating device connected between the spindle and the measuring element, indicating means associated with the measuring screw having divisions indicating the relative angular position of the measuring screw in terms of units of relative linear adjustment of the measuring element, an indexing device comprising an indexing member on the measuring screw and a relatively stationary member arranged to cooperate with said indexing member for locating the screw in successively spaced angular indexed positions corresponding with divisions of said indicating means, and means for adjusting said indexing member eccentrically of the measuring screw to compensate the screw for periodic harmonic errors in the screw.

5. In a measuring machine, the combination of a base, a headstock comprising a headstock spindle support shiftable on the base, a headstock shiftable on the support, a feed screw and nut supported from the base and connected to move the headstock spindle support, a measuring screw synchronized to turn with the feed screw, a measuring element arranged to be moved by the measuring screw axially with but independently of the headstock spindle support, indicating means associated with the measuring screw having divisions indicating the angular position of adjustment of the screw in terms of units of linear adjustment of said measuring element, mechanical means for accurately locating the measuring screw in each position of angular adjustment in accordance with the indication of said divisions, and a fine adjustment for the headstock spindle comprising means for effecting a fine movement of the spindle, and a fine adjustment indicating means for indicating the position of the headstock spindle with relation to the measuring element.

6. In a measuring machine, the combination of a base, a headstock comprising headstock spindle support shiftable on the base, a headstock spindle shiftable on the headstock spindle support, a feed screw and nut connected between the base and headstock spindle support for effecting adjustment of the headstock spindle support, a measuring screw substantially in alignment with the headstock spindle and synchronized to turn with the feed screw, a measuring element in the form of a frame threaded to the measuring screw and having the contact surface thereof disposed in alignment with the headstock spindle, indicating means associated with the measuring screw having divisions indicating the adjusted angular position of the measuring screw in terms of linear adjustment of the measuring element, a strained element interposed between said contact surface of the measuring element and the headstock spindle, and strain sensitive gauging means to provide an indication of any variation of strain in said strained element.

7. In a measuring machine, a base, a measuring head movable on the base, means for imparting measured movements to the measuring head including a measuring element movable independently of and in the same direction with the measuring head on the base, a micrometer screw and nut connected between the measuring element and the base, and actuating means synchronized with the micrometer screw and nut for moving the measuring head with the measuring element, indicating means having divisions indicating the relative angular position of said screw and nut in terms of units of relative linear adjustment of said screw and nut, and an indexing device for relatively positioning said screw and nut with respect to any selected division of said indicating means, a fine adjustment means acting independently of the screw and nut for effecting a fine adjustment of the measuring head relative to the measuring element, and a fine adjustment indicating means connected between the measuring head and measuring element calibrated for indicating the position of the measuring head with relation to the screw and nut in terms of subdivisional units of length.

8. In a measuring machine, a base, a measuring head movable on the base including a measuring element movable independently of and in the same direction with the measuring head on the base, a micrometer screw on the base, and a nut arranged to travel thereon attached to the measuring element, and actuating means connected between the base and the measuring head and synchronized with the micrometer screw and nut for moving the measuring head with the measuring element, indicating means having devices indicating the relative angular position of the screw and nut in terms of units of linear adjustment of the nut, a circular indexing plate connected to rotate with the screw having indentations therein corresponding with the divisions of said indicating means, a pawl arranged for engagement in said indentations for positioning the screw with respect to any selected device of said indicating means, fine adjustment means supplementing the operation of said actuating means for moving the measuring head relative to the measuring element a linear distance equal to that represented by one of said devices, and a fine adjustment indicating means connected between the measuring head and the measuring element having subdivisions for indicating the linear adjustment of the measuring head relative to the measuring element in terms of subdivisional units of length.

9. In a measuring machine, a base, a measuring head movable on the base, a measuring member movable independently of and in the same direction with the measuring head on the base providing a reference position for the measuring head, a micrometer device supported from the base for moving the measuring member through a predetermined distance, actuating means connected between the base and the measuring head and synchronized with the micrometer device for moving the measuring head with the measuring member, and an indicating means for indicating the position of the measuring head with respect to the measuring member comprising a strained element connected between said member and the measuring head to be subjected to variable strain by movement of the measuring head relative to said member, and strain sensitive gauging means comprising a Wheatstone bridge circuit including a bonded electrical strain sensitive gauge on said strained element, an amplifier and visual inspection unit connected to provide a magnified indication of any unbalance of said Wheatstone bridge circuit, and a variable element arranged to control the balance of said Wheatstone bridge circuit adjustable to effect a zero balance of said Wheatstone bridge circuit and calibrated to indicate in predetermined units of linear measure the corresponding distance required to be moved by the measuring head to restore said balance.

10. In a measuring machine, a base, a measuring head movable on the base, a measuring member movable independently of and in the same direction with the measuring head on the base, means for imparting measured movements to the measuring member and head including a measuring screw connected between the measuring member and base, actuating means connected between the base and the measuring head and synchronized with a measuring screw for moving the measuring head with relation to the measuring member for the fine adjustment thereof, and indicating means for indicating the position of the measuring head with relation to said member comprising a strained element connected between said member and the measuring head to be subjected to variable strain by movement of the measuring head relative to said member, and strain sensitive gauging means comprising a Wheatstone bridge circuit including a group of bonded electrical strain sensitive gauges on said strained element, an amplifier and visual inspection unit connected to provide a magnified indication of any unbalance of said Wheatstone bridge circuit, and a variable element arranged to control said Wheatstone bridge circuit adjustable to effect a zero balance of said Wheatstone bridge circuit, and calibrated to indicate in predetermined units of linear measure the corresponding distance required to be moved by the measuring head to restore said balance.

11. In a measuring machine, a base, a measuring head movable on the base, a measuring member movable independently of and in the same direction with the measuring head on the base, means for imparting measuring movements to the measuring member and head including a measuring screw connected between the measuring member and base, actuating means connected between the base and the measuring head and synchronized with the measuring screw for moving the measuring head with the measuring member, means connected through said actuating means for moving the measuring head with relation to the measuring member for the fine adjustment thereof, and indicating means for indicating the position of the measuring head with relation to said member comprising a strained element connected between said member and the measuring head to be subjected to variable strain by movement of the measuring head relative to said member, and strain sensitive gauging means comprising a Wheatstone bridge circuit including a group of bonded electrical strain sensitive gauges on said strained element, an amplifier and visual inspection unit connected to provide a magnified indication of any unbalance of said Wheatstone bridge circuit, a dial potentiometer connected across said Wheatstone bridge circuit adjustable to effect a zero balance of said Wheatstone bridge circuit, and having the dial thereof calibrated to indicate in predetermined units of linear measure the corresponding distance required to be moved by the measuring head to restore said balance, and a scale adjustment potentiometer connected in parallel with said dial potentiometer.

12. A measuring machine having, in combination, a base, a footstock on the base, a footstock spindle movable thereon, a headstock assembly including a headstock spindle on the base in opposed relation to the footstock spindle for the engagement of a work piece therebetween, a measuring member connected to be moved with the headstock spindle, means for imparting measured movements to said headstock spindle and measuring member including a micrometer device supported from the base for imparting measured movements to the measuring member, and actuating means synchronized with the micrometer device and acting independently thereof for moving the headstock spindle with the measuring member, means supported independently of said micrometer device for moving the headstock spindle with relation to the measuring member for the fine adjustment thereof, and indicating means associated with each of said footstock and headstock spindles comprising strained elements connected between the headstock spindle and measuring member, and between the footstock spindle and footstock and arranged to be subjected to measurable variations of strain by movement of headstock and footstock spindles respectively, strain sensitive gauging means comprising Wheatstone bridge circuits including groups of bonded electrical strain sensitive gauges on said strained elements respectively, an amplifier and visual inspection unit, and means for connecting said unit to provide a magnified indication of any unbalance of either of said Wheatstone bridge circuits selectively, a zero adjustment variable element connected to control the balance of the footstock Wheatstone bridge circuit, and a variable element connected to control the balance of said headstock Wheatstone bridge circuit adjustable to effect a zero balance of said headstock connected Wheatstone bridge circuit and calibrated to indicate in predetermined units of linear measure the corresponding distance required to be moved by the measuring head to restore said balance.

13. In a measuring machine, a measuring head, means for imparting measured movements to the measuring head including a measuring screw and nut, indicating means having divisions indicating the relative angular position in terms of units of relative linear adjustment of said screw and nut, an indexing plate connected to turn with the screw having indentations arranged in a circular pattern corresponding with divisions of said indicating means, a pawl detent engaging said indentations for relatively positioning said screw and nut with respect to any selected division of said indicating means, said indexing plate being further arranged for adjustment eccentrically with relation to the axis of the measuring screw in a direction and by an amount to compensate for periodic harmonic errors in the screw.

14. In a measuring machine, a measuring head, means for imparting measured movements to the measuring head including a measuring screw and nut, an indexing device comprising an indexing member on the screw and a relatively stationary member arranged to cooperate with said indexing member for locating the screw in successively spaced angular indexed positions, and a loose supporting connection between the screw and indexing member for the adjustment of said indexing member eccentrically of the measuring screw in a direction and by an amount to compensate for periodic harmonic errors in the screw.

15. In a measuring machine, a work contacting element movable to measure the work, means for effecting a measured movement of said work contacting element including a measuring screw, and means for indexing the screw having a number of indicated stop positions, said indexing means including an indexing plate connected to rotate with the screw having stop surfaces corresponding with the indicated stop positions of said member, pivotal supporting means on which said index plate is freely adjustable eccentrically about its axis to compensate for periodic harmonic errors in the screw, and a stop element cooperating with said stop surfaces for adjusting the successive indexed stop positions of the screw.

16. In a measuring machine, a work contacting element movable to measure the work, means for effecting a measured movement of said work contacting element including a measuring screw, and means for indexing the screw having a number of indicated stop positions, said indexing means including a circular indexing plate with stop stations at equally spaced intervals about the periphery thereof connected to rotate with the screw and mounted for adjustment eccentrically freely about its axis to provide successive indexed positions of the screw adjusted to compensate for periodic harmonic errors of the screw.

17. In a measuring machine, a work contacting element movable to measure the work, means for effecting a measured movement of said work contacting element including a measuring screw, and means for indexing the screw including indicating means providing a number of predetermined stop positions, an indexing plate connected to rotate with the screw and having stop surfaces corresponding with said indicated stop positions, a stop member movable in a fixed path into cooperating engagement with said stop surfaces to control the indexed stop position of the screw, and means supporting said indexing plate for adjustment eccentrically of its axis in a direction and by an amount to adjust the indexed stop positions of the screw to compensate for periodic harmonic errors of the screw.

18. In a measuring machine, a measuring head, means for imparting measured movements to the measuring head including a measuring screw and nut, an indicating dial secured to turn with the screw having divisions indicating successive angular positions of the screw in terms of units of linear adjustment of the nut, an indexing plate secured to turn with the screw and dial having indentations arranged in a circular pattern corresponding with divisions of said indicating dial, a pawl detent, and means for yieldably engaging the pawl detent in said indentations for positioning the screw with respect to any selected division of said indicating dial, and supporting means for the indexing plate arranged to permit adjustment of the indexing plate eccentrically with relation to the measuring screw in a direction and by an amount to compensate for periodic harmonic errors in the screw.

19. A measuring machine, a measuring head, means for imparting measured movements to the measuring head including a measuring screw and nut, an indicating dial secured to turn with the screw having divisions indicating successive angular positions of the screw in terms of units of linear adjustment of the nut, an indexing plate secured to turn with the screw and dial having indentations arranged in a circular pattern corresponding with divisions of said indicating dial, a pawl detent arranged to engage said indentations for positioning the screw in accordance with any selected division of said indicating dial, a snap spring acting on the pawl for positioning the pawl alternatively against and away from said indentations, manual means for shifting the pawl between engaging and disengaged positions, and supporting means for the index plate arranged to permit adjustment of the indexing plate eccentrically with relation to the measuring screw in a direction and by an amount to compensate for periodic harmonic errors in the screw.

20. In a measuring machine, a base, a measuring head movable on the base, means for imparting measured movements to the measuring head including a micrometer screw supported from the base and a measuring member having a threaded connection with the screw to be moved by the screw with the measuring head on the base, actuating means synchronized with the screw for moving the measuring head with the measuring member, indicating means having divisions indicating the angular position of said screw, a fine adjustment control for moving the measuring head relative to the measuring member and screw, and fine adjustment indicating means comprising an element connected between the measuring head and measuring member and arranged to be subjected to measurable variations of strain by movement of the measuring head relative to the measuring member, strain sensitive gauging means connected with said strained element to provide an indication of any variation of such strain, and visual inspection means to present said indication for visual inspection.

21. In a measuring machine, a base, a measuring head movable on the base, means for imparting measured movements to the measuring head including a micrometer screw supported from the base and a measuring member having a threaded connection with the screw to be moved by the screw with the measuring head on the base, actuating means synchronized with the screw for moving the measuring head with the measuring member, indicating means having divisions indicating the angular position of said screw, an indexing device for mechanically positioning said screw with respect to any selected division of said indicating means, a fine adjustment control for moving the measuring head relative to the measuring member and screw, and fine adjustment indicating means comprising an element connected between the measuring head and measuring member and arranged to be subjected to measurable variations of strain by movement of the measuring head relative to the measuring member, strain sensitive gauging means connected with said strained element to provide an indication of any variation of such strain, and visual inspection means to present said indication for visual inspection.

22. In a measuring machine, a base, a measuring head movable on the base, means for imparting measured movements to the measuring head including a micrometer screw supported from the base and a measuring member having a threaded connection with the screw to be moved by the screw with the measuring head on the base, actuating means synchronized with the screw for moving the measuring head with the measuring member, indicating means having divisions indicating the angular position of said screw, an indexing device for positioning said screw with respect to any selected division of said indicating means, a fine adjustment control for moving the measuring head relative to the measuring member and screw, and fine adjustment indicating means comprising an element connected between the measuring head and measuring member and arranged to be subjected to measurable variations of strain by movement of the measuring head relative to the measuring member, and strain sensitive gauging means comprising bonded electrical strain sensitive gauges mounted on said strained member and connected in a Wheatstone bridge circuit to provide an indication of such strain variations, and electrical amplifying and visual inspection means to provide an amplified indication of any unbalance of said Wheatstone bridge circuit.

23. A measuring machine having, in combination, a base, a pair of work contacting anvils movable on the base for the measurement of a work piece therebetween, a support associated with each anvil providing a reference position with relation to which the anvil is movable, yieldable means urging one of said anvils against the work under a controlled pressure, means for effecting movement of the other of said anvils for the measurement of a work piece against said controlled anvil pressure which comprises a micrometer screw and nut connected between the support associated with the latter anvil and the base, actuating means connected between the base and said latter anvil and synchronized with the micrometer screw and nut for moving said latter anvil with the associated support, means connected with said actuating means for moving said latter anvil with relation to the associated support, and indicating means having divisions indicating the relative angular position of said screw and nut in terms of units of linear adjustment of said associated support, and indicating means responsive to movement of each of said anvils with relation to said reference position comprising an element connected between each anvil and the associated support to be maintained under a condition of strain variable in accordance with changes in the position of the respective anvil, strain sensitive gauging means connected with said strained elements to provide indications of strain variation imposed upon said strained elements by movement of the respective anvils, and visual inspection means connected to present for visual inspection said indications of strain variation.

24. A measuring machine having, in combination, a base, a pair of work contacting anvils movable on the base for the measurement of a work piece therebetween, a support associated with each anvil providing a reference position with relation to which the anvil is movable, yieldable means urging one of said anvils against the work under a controlled pressure, means for effecting movement of the other of said anvils for the measurement of a work piece against said controlled anvil pressure which comprises a micrometer screw and nut connected between the support associated with the latter anvil and the base, actuating means connected between the base and said latter anvil and synchronized with the micrometer screw and nut for moving said latter anvil with the associated support, means connected with said actuating means for moving said latter anvil with relation to the associated support, and indicating means having divisions indicating the relative angular position of said screw and nut in terms of units of linear adjustment of said associated support, an indicating means responsive to movement of each of said anvils with relation to said reference position comprising an element connected between each anvil and the associated support to be maintained under a condition of strain variable in accordance with changes in the position of the respective anvil, strain sensitive gauging means associated with each of the anvils comprising Wheatstone bridge circuits embodying electrical strain sensitive gauging means on each of said strained elements, means for adjusting the balance of each of said Wheatstone bridge circuits, and electrical amplifier and visual inspection means to provide a magnified indication of any unbalance of said Wheatstone bridge circuits.

25. A measuring machine having, in combination, a base, a pair of work contacting anvils movable on the base for the measurement of a work piece therebetween, a support associated with each anvil providing a reference position with relation to which the anvil is movable, yieldable means urging one of said anvils against the work under a controlled pressure, means for effecting movement of the other of said anvils against said controlled anvil pressure for the measurement of a work piece, said means for moving the latter of said anvils comprising a micrometer screw and nut connected between the associated support and the base, actuating means connected between the base and said latter anvil and synchronized with the micrometer screw and nut for moving said latter anvil with the associated support, means connected with said actuating means for moving said latter anvil with relation to the associated support, and indicating means having divisions indicating the relative angular position of said screw and nut in terms of units of linear adjustment of said associated support, and indicating means responsive to movement of each of said anvils with relation to said reference position comprising an element connected between each anvil and the associated support to be maintained under a condition of strain variable in accordance with changes in the position of the respective anvil, strain sensitive gauging means comprising Wheatstone bridge circuits including bonded electrical strain sensitive gauges on each of said strained elements, and electrical amplifier and visual inspection means to present for visual inspection amplified indication of any unbalance in each of said Wheatstone bridge circuits.

26. A measuring machine having, in combination, a base, a pair of work contacting anvils movable on the base for the measurement of a work piece therebetween, a support associated with each anvil providing a reference position with relation to which the anvil is movable, yieldable means urging one of said anvils against the work under a controlled pressure, means for effecting movement of the other of said anvils against said controlled anvil pressure for the measurement of a work piece, said means for moving the latter of said anvils comprising a micrometer screw and nut connected between the associated support and the base, actuating means connected between the base and said latter anvil and synchronized with the micrometer screw and nut for moving said latter anvil with the associated support, means connected with said actuating means for moving said latter anvil with relation to the associated support, and indicating means having divisions indicating the relative angular position of said screw and nut in terms of units of linear adjustment of said associated support, and indicating means responsive to movement of each of said anvils with relation to said reference position comprising an element connected between each anvil and the associated support to be maintained under a condition of strain variable in accordance with changes in the position of the respective anvil, strain sensitive gauging means comprising bonded electrical strain sensitive gauges on each of said strained elements connected in a Wheatstone bridge circuit, an electrical amplifier and visual inspection unit adapted to provide an amplified indication of unbalance in the Wheatstone bridge circuits, and means connecting said amplifier and visual inspection unit alternatively with one or the other of said Wheatstone bridge circuits.

27. A measuring machine having, in combination, a base, a pair of work contacting anvils movable on the base for the measurement of a work piece therebetween, a support associated with each anvil providing a reference position with relation to which the anvil is movable, yieldable means urging one of said anvils against the work under a controlled pressure, means for effecting movement of the other of said anvils against said controlled anvil pressure for the measurement of a work piece, said means for moving the latter of said anvils comprising a micrometer screw and nut connected between the associated support and the base, actuating means connected between the base and said latter anvil and synchronized with the micrometer screw and nut for moving said latter anvil with the associated support, means connected with said actuating means for moving said latter anvil with relation to the associated support, and indicating means having divisions indicating the relative angular position of said screw and nut in terms of units of linear adjustment of said associated support, and indicating means responsive to movement of each of said anvils with relation to said reference position comprising an element connected between each anvil and the associated support to be maintained under a condition of strain variable in accordance with changes in the position of the respective anvil, strain sensitive gauging means associated with the yieldably actuated anvil comprising a Wheatstone bridge circuit embodying electrical strain sensitive gauging means on the associated strained element and means for balancing said circuit, a Wheatstone bridge circuit comprising electrical strain sensitive gauging means on the strained element associated with said anvil movable for the measurement of the work piece, means for balancing said latter Wheatstone bridge circuit calibrated to indicate in predetermined units of linear measure a corresponding distance required to be moved by said measuring anvil to balance the circuit, and electrical amplifier and visual inspection means to provide a magnified indication of any unbalance of said Wheatstone bridge circuits.

28. A measuring machine having, in combination, a base, headstock and footstock assemblies carried on the base, headstock and footstock spindles in said assemblies including work contacting anvils movable for the measurement of a work piece between said anvils, headstock and footstock supports providing reference positions with relation to which the respective anvils are movable, yieldable means urging the footstock anvil against the work under a controlled pressure, means for effecting measurable movement of the headstock support, and a further fine movement of the headstock anvil relatively thereto for the measurement of a work piece against said controlled pressure, strained elements in the condition of collapsed columns disposed between each anvil and the respective headstock and footstock supports, strain sensitive gauging means associated with each strained element to provide indication of strain variation imposed upon said strained elements by movement of the respective anvil, visual inspection means connected to present for visual inspection any indication of strain variation of each strained element, and a metering device associated with the headstock strain sensitive gauging means, calibrated for measuring in very small units of linear distance the movement of the headstock anvil relative to the headstock support.

29. In a measuring machine, a footstock assembly which comprises a footstock, a footstock spindle axially movable on the footstock, a support providing a reference position with relation to which the footstock spindle is movable, an element connected between said spindle and support to be maintained under a condition of strain variable in accordance with changes in the position of the spindle, adjustable spring means acting upon said spindle in a direction opposite to said strained element, said element and spring means being chosen of such relative strength to cause said spindle to exert a predetermined net engaging pressure outwardly away from the footstock against an external work surface, an internal measuring attachment comprising an internal anvil support and an internal work engaging anvil supported thereon, and spring means urging the anvil support against the footstock spindle chosen of such relative strength to cause said anvil to exert a predetermined net engaging pressure inwardly toward the footstock against an internal work surface.

30. In a measuring machine, a footstock assembly which comprises a footstock, a footstock spindle axially movable on the footstock, a support providing a reference position with relation to which the footstock spindle is movable, an element connected between said spindle and support to be maintained under a condition of strain variable in accordance with changes in the position of the spindle, adjustable spring means acting upon said spindle in a direction opposite to said strained element, said element and spring means being chosen of such relative strength to cause said spindle to exert a predetermined net engaging pressure outwardly away from the footstock against an external work surface, an internal measuring attachment comprising an internal anvil support and an internal work engaging anvil supported thereon, spring means urging the anvil support against the footstock spindle chosen of such relative strength to cause said anvil to exert a predetermined net engaging pressure inwardly toward the footstock against an internal work surface, and adjusting means for said adjustable spring means adjustable to determine the net footstock work engaging pressure for external and internal measurements respectively.

31. A measuring machine having in combination a base, headstock and footstock assemblies including headstock and footstock spindles with work contacting anvils movable axially for the measurement of a work piece between said anvils, headstock and footstock supports on the base providing reference positions with relation to which the respective anvils are movable, yieldable means urging the footstock anvil against the work under a controlled pressure, means for effecting measurable movement of the headstock support and a headstock anvil and a further fine movement of the headstock anvil relatively thereto for the measurement of a work piece against said controlled pressure which comprises a micrometer device connected between the headstock reference support and the base, actuating means synchronized with the micrometer device and acting independently thereof for moving the headstock anvil with the associated reference support, a fine adjustment means connected with the actuating means for moving the headstock anvil relative to the associated reference support, an indicating means associated with the micrometer device for indicating the position of the headstock reference support in terms of units of linear adjustment of said reference support, strained elements in the form of collapsed columns connected between each of the headstock and footstock spindles and the respective reference supports, whereby said elements are maintained under a condition of strain resulting in failure of the elements as columns and in bending said elements but without exceeding the elastic limit, and are extended and compressed within an area of substantially constant resistance in accordance with changes in the positions of the headstock and footstock spindles respectively, adjustable spring means in addition to the footstock supported strained element acting upon the footstock spindle, said footstock strained element and spring means being chosen of such relative strength and having the pressure thereof so directed to cause the footstock spindle to exert a predetermined net engaging pressure outwardly against an external surface of the work to be measured, a Wheatstone bridge circuit associated with each of said strained elements comprising strain sensitive gauges, and means for balancing said circuits, including a potentiometer associated with the headstock Wheatstone bridge circuit calibrated to indicate in predetermined units of linear measure the corresponding distance required to be moved by said headstock measuring anvil to balance the circuit, an electrical amplifier and visual inspection means to provide a magnified indication of any unbalance of said Wheatstone bridge circuits.

32. A measuring machine having in combination a base, headstock and footstock assemblies including work contacting spindles axially movable for the measurement of a work piece between said spindles, headstock and footstock spindle supports on the base providing reference positions with relation to which the respective spindles are movable, and means for imparting measured movements to the headstock spindle including a micrometer screw and nut connected between the headstock reference support and the base, actuating means synchronized with the micrometer screw and nut for moving the headstock spindle with the headstock reference support, indicating means having divisions indicating the relative angular position of said screw and nut in terms of units of linear adjustment of the headstock reference support, a fine adjustment means supplementing the operation of said actuating means for moving the headstock spindle relative to the reference support a linear distance at least equal to that represented by one of said divisions, strained elements in the form of collapsed columns connected between each of the headstock and footstock spindles and the respective reference supports whereby said elements are maintained under a condition of strain resulting in failure of the elements as columns and in bending said elements but without exceeding the elastic limit and are extended and compressed within an area of substantially constant resistance in accordance with changes in the positions of the headstock and footstock spindles respectively, strain sensitive gauging means including bonded electrical strain gauges mounted on each strained element to provide indication of strain variation imposed upon said strained element by movement of the respective anvil, adjustable spring means in addition to said footstock supported element acting upon the footstock spindle, said footstock strained element and spring means being chosen of such relative strength and having the pressure thereof so directed to cause the footstock spindle to exert a predetermined net engaging pressure outwardly against an external surface of the work to be measured, internal measuring attachments for the headstock and footstock, each attachment comprising an internal anvil support and an internal work engaging anvil supported thereon, spring means urging the footstock internal work engaging anvil against the footstock spindle and against the internal work surface of such relative strength to cause said footstock internal work engaging anvil to exert a predetermined net engaging pressure inwardly against an internal work surface and manually operable means to adjust said adjustable spring means to determine the net footstock work engaging pressure for external and internal measurements respectively.

GEORGE N. LEVESQUE.

REFERENCES CITED

The following references are of record in the file of this patent:

UNITED STATES PATENTS

| Number | Name | Date |
|---|---|---|
| 1,005,883 | Roch et al. | Oct. 17, 1911 |
| 1,027,418 | Heide | May 28, 1912 |
| 1,033,866 | Blaine | July 30, 1912 |
| 1,053,281 | Coullery | Feb. 18, 1913 |
| 1,167,644 | Jaques, Sr. | Jan. 11, 1916 |
| 1,267,946 | Wester | May 28, 1918 |
| 1,389,341 | Blood | Aug. 30, 1921 |
| 1,419,004 | Allen | June 6, 1922 |
| 1,448,373 | Bartholdy | Mar. 13, 1923 |
| 1,477,206 | Blood | Dec. 11, 1923 |
| 1,667,562 | Neubauer | Apr. 24, 1928 |
| 1,900,231 | Ede | Mar. 7, 1933 |
| 1,939,030 | Wood | Dec. 12, 1933 |
| 1,981,153 | Schoof | Nov. 20, 1934 |
| 2,083,759 | Temple | June 15, 1937 |
| 2,112,491 | Hintz | Mar. 29, 1938 |
| 2,115,351 | Terry et al. | Apr. 26, 1938 |
| 2,125,584 | Rotzoll | Aug. 2, 1938 |
| 2,192,343 | Earl et al. | Mar. 5, 1940 |
| 2,208,635 | Johnson | July 23, 1940 |
| 2,230,864 | Edwards et al. | Feb. 4, 1941 |
| 2,316,975 | Ruge | Apr. 20, 1943 |
| 2,351,246 | Walling | June 13, 1944 |
| 2,357,510 | Flygare et al. | Sept. 5, 1944 |
| 2,383,461 | Esval et al. | Aug. 28, 1945 |
| 2,387,496 | Cornelius | Oct. 23, 1945 |
| 2,437,639 | Floyd | Mar. 9, 1948 |
| 2,448,473 | Shrewsbury | Aug. 31, 1948 |

(Other references on following page)

FOREIGN PATENTS

| Number | Country | Date |
|---|---|---|
| 14,359 | Switzerland | May 26, 1897 |
| 16,332 | Great Britain | July 23, 1904 |
| 70,598 | Norway | May 12, 1947 |
| 75,062 | Switzerland | Dec. 6, 1916 |
| 188,067 | Switzerland | Mar. 1, 1937 |
| 362,913 | Germany | Nov. 2, 1922 |
| 408,394 | Great Britain | Apr. 12, 1934 |

OTHER REFERENCES

Pub.: Journal of Scientific Instruments, November 1945, page 219, article entitled "An Electrical Micrometer" by D. C. Gall. (This is stated to be an abstract of an article by D. C. Gall appearing in F. Instn. Elect. Engrs., Pt. II, 89, pages 434, dated 1942.)